June 10, 1952   A. G. SEIFRIED   2,600,273
APPARATUS FOR MAINTAINING ALIGNMENT OF TRAVELING BELTS
Filed Jan. 29, 1949
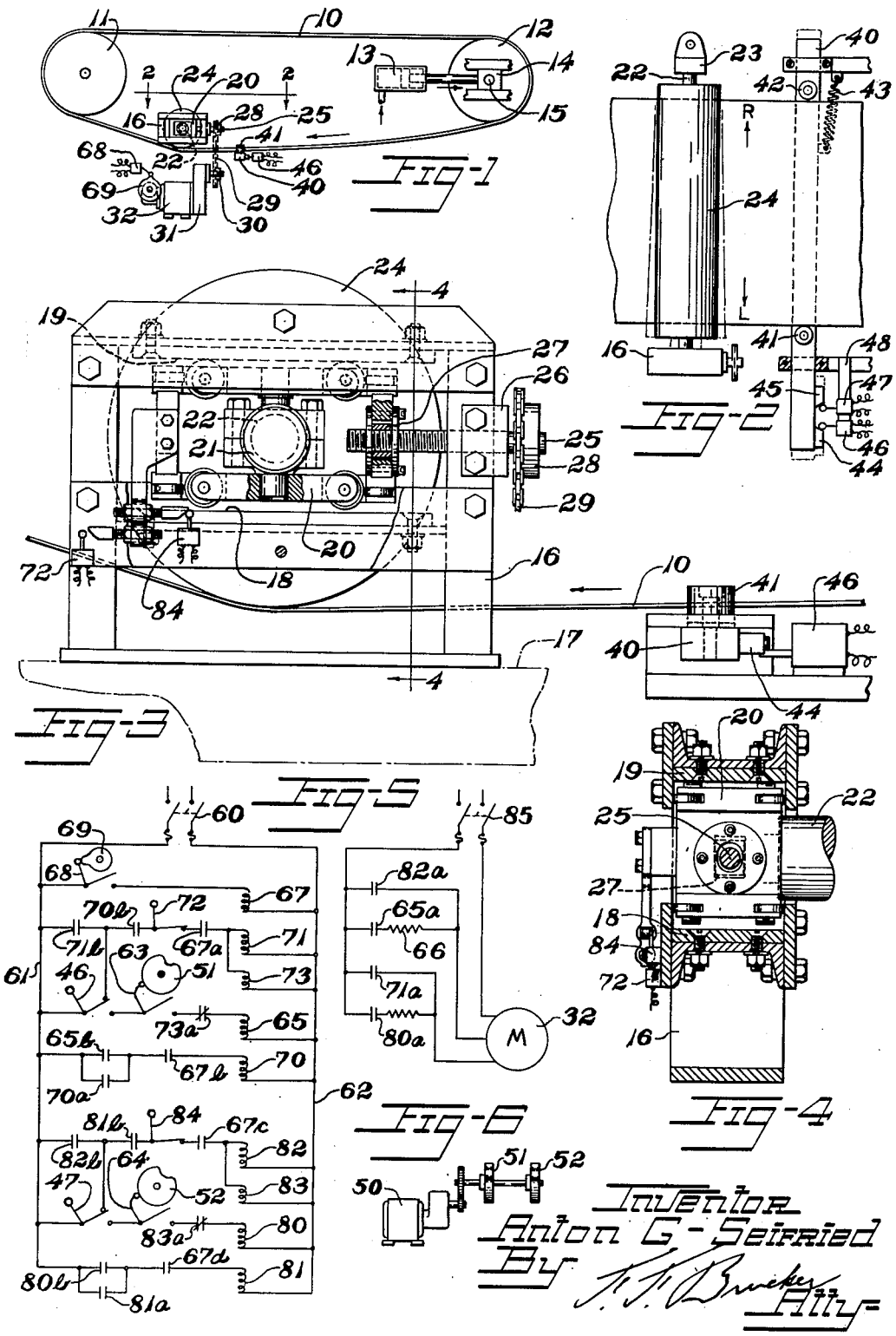
Inventor
Anton G. Seifried Patented June 10, 1952

2,600,273

UNITED STATES PATENT OFFICE 2,600,273

APPARATUS FOR MAINTAINING ALIGNMENT OF TRAVELING BELTS

Anton G. Seifried, Akron, Ohio, assignor to The B. F. Goodrich Company, New York, N. Y., a corporation of New York Application January 29, 1949, Serial No. 73,497

11 Claims. (Cl. 74—241)

This invention relates to maintaining alignment of travelling belts or similar webs and is especially useful in maintaining alignment of the casting belt of a film casting apparatus, although the invention is also useful in maintaining alignment of other belts and travelling webs of sheet material.

In film-casting machines an endless band usually of sheet metal is trained about a pair of supporting drums and travels at considerable speed while plastic material is applied thereto, dried and removed therefrom. As such belts are of considerable length and width and are readily expanded and contracted by heat applied thereto to dry the film, the problem of maintaining alignment of the belt at the casting position has been a difficult one. Such alignment-maintaining apparatus as has been proposed in the past for this purpose has provided for constant shifting or hunting movement of the belt which has resulted in continuous drifting of the belt resulting in a product having sinuous margins requiring trimming of such margins with great waste of material. Also such devices have generally not been dependable and have required constant watchfulness on the part of the operators. Such casting belts are very expensive and require a long time to install and prepare for operation, and great damage would occur should the belt move excessively to one side or the other and thereby contact with stationary objects such as the frame of the apparatus.

It is an object of the present invention to overcome the foregoing and other difficulties by providing precision alignment of the belt.

Other objects are to provide for application of successive shifting forces of increasing magnitude to the belt by small increments of adjustment, to provide quick return of the force-applying means to normal position, to provide discontinued operation of the force applying means when the belt is running in proper alignment, and to prevent interference between the means for applying corrective forces to the belt in opposite directions.

These and other objects will appear from the following description and the accompanying drawings.

Of the drawings:

Fig. 1 is a side elevation of a belt and its supporting and tensioning means with the alignment maintaining apparatus of the invention applied thereto, Fig. 2 is a sectional view thereof taken on line 2—2 of Fig. 1, parts being broken away, Fig. 3 is an end elevation, partly broken away and partly in section of the belt aligning mechanism, Fig. 4 is a sectional view taken on line 4—4 of Fig. 3, Fig. 5 is a wiring diagram, and Fig. 6 is a detail of the timing mechanism.

Referring to the drawings which illustrate one embodiment of the invention, the numeral 10 designates an endless belt of metal trained about driving and idler drums 11, 12 respectively and held under constant tension, as by a pressure fluid cylinder 13, the piston of which engages a bearing 14, in which a shaft 15 rotatably supporting the drum 12 is journaled. A similar pressure cylinder tensions the opposite end of shaft 15, the bearings being slideably mounted on a frame supporting the drums.

For providing frictional engagement with the lower or return reach of the belt a guide frame 16 is mounted on a frame member 17 of the apparatus and has horizontal guide rails 18, 19 between which carriage 20 may move arcuately in the longitudinal direction of the belt. The carriage supports on a vertical pivot axis, a bearing 21 in which a shaft 22 is rotatably mounted. The opposite shaft bearing 23 is pivotally mounted on the frame of the apparatus. A roll 24 is fixed to shaft 22 and contacts the return reach of the belt. The arrangement is such that the roll 24, whose axis is normally perpendicular to the direction of travel of the belt, may be moved about a pivot at bearing 23 to a range of positions where it contacts the belt diagonally.

For adjusting the roll 24 to apply corrective forces to the belt, a screw threaded shaft 25 is rotatably mounted in a bearing 26 on frame member 16 and its threaded portion engages a threaded nut 27 mounted on the carriage 20. A sprocket 28 is fixed to shaft 25 and is driven by a chain 29 from a sprocket 30 on a speed reducer 31 driven in turn by a reversible electric motor 32.

For controlling operation of the motor 32 and thereby the roller 24, a detector bar 40 is supported across the lower face of the return reach of the belt for movement, being mounted on roller bearings on the frame for free endwise movement. A pair of feeler rolls 41, 42 are rotatably mounted about vertical axes on the detector bar for engaging the edges of the belt and for moving the detector bar. The distance between the rollers 41, 42 is slightly greater than the width of the belt and a light tension coil spring 43 has one end fixed to the bar and the other end fixed to the stationary frame of the apparatus so as to keep the roller 41 against the edge of the belt at all times, the other roller 42 merely acting in case of failure of the spring. This provides for unavoidable variations in the width of the belt.

Mounted on the bar 40 are a pair of adjustable cam blocks 44, 45. A pair of micro-switches 46, 47 are adjustably mounted on a bar 48 parallel to bar 40 and fixed to the stationary frame. The arrangement is such that movement of the bar by an amount as small as 6 one-thousandths of an inch will operate the switches.

A small synchronous timing motor 50 is provided with two cam discs 51, 52 each having a notch in its margin, see Fig. 6. Each cam disc rotates continuously and makes one revolution in 5 seconds operating a switch which is closed during one-half second during each revolution. The switches are numbered 63 and 64 and are connected into the control circuit which operates motor 32. For limiting movement of the roller 24 a cam plate is mounted on carriage 20 in position to contact a pair of limit switches 72, 84 in the circuit controlling motor 32.

Referring to the wiring diagram, Fig. 5, low voltage current is applied to the control circuit through a double-pole switch 60 energizing lines 61, 62 and a separate current is applied to the power circuit of motor 32 through a double pole switch 85. Motor 32 is preferably operated by direct current and by current of higher potential than that of the control circuit. Lines 61, 62 are connected by a number of shunt circuits which are all open when the belt 10 is running in proper alignment. The motor 50 is also operated from a separate circuit. The timing motor however is operating so that normally open switches 63 and 64 are closed momentarily every five seconds but as other switches in these circuits are open, the circuits in which they are located are not energized thereby. In the electrical circuits shown in Fig. 5 numerals having a letter affixed thereto represent switch contacts opened or closed by a solenoid having the same number without an affix, as for example solenoid 65 when energized, closes switch contacts 65a and 65b.

Now should the belt 10 start drifting in a direction "R" in Fig. 2 cam 44 will move switch 46 to a position such that it would normally close a circuit through a solenoid 65. The solenoid 65 will not be energized however until switch 63 closes at the next revolution of cam 51, whereupon it will be energized for one-half second, thereby closing relay switch 65a and starting motor 32 at a slow speed through a resistance 66 in a direction to move the adjustable end of roll 24 to the right in Fig. 3. This movement will be on the order of one-fiftieth of an inch and will not be sufficient to rotate cam 69 far enough to open switch 68. Should the belt now have returned to its normal position, switch 46 would have opened and motor 32 would be inactive. However, should the belt continue drifting in the direction "R" the next revolution of cam 51 will start the motor 32 in the same manner and direction, moving roll 24 through another angular increment and providing a greater force to return the belt to normal position. The cam 69 will be rotated whenever motor 32 is rotated, and after several successive angular moves of roll 24, an amount which has been found by experience to be sufficient to always initiate return of the belt to normal position, cam 69 will permit switch 68 to close, thereby energizing solenoid 67 which in turn will close switches 67a, 67b, 67c and 67d. At the next revolution of cam 51, switch 65b will be momentarily closed in the circuit of solenoid 70 and, as 67b is now closed, solenoid 70 is energized, closing switch 70a in the holding circuit about switch 65b, and also closing switch 70b in the circuits of solenoids 71 and 73. As switch 67a is now closed and the belt is returning to normal position, the belt operates switch 46 to close a circuit through switches 70b and 67a, energizing solenoids 71 and 73. Solenoid 73 merely opens switch 73a in the circuit of solenoid 65 to prevent interference of rotative forces. Solenoid 71 closes switch 71a starting motor 32 in the reverse direction at high speed and closes a switch 71b providing a holding circuit for itself until cam 69 opens switch 68 due to roll 24 having returned to normal position, or carriage 20 opens switch 72.

Now should the belt drift in the direction "L" from its normal position, movement of the bar 40 will shift switch 47 to a position where it will close the circuit to solenoid 80 provided switch 64 is closed. As rotating cam 52 closes switch 64, solenoid 80 is energized, closing switch 80a in the motor circuit and starting motor 32 at slow speed in a left-hand direction for a one-half second, thereby shifting roll 24 by a small increment. This is repeated at each revolution of cam 52 until cam 69 releases switch 68 and permits its closing, energizing solenoid 67. When this occurs, 67d is closed and upon solenoid 80 being energized again switch 80b is closed energizing solenoid 81. This in turn closes its holding switch 81a and also closes switch 81b in the circuits of solenoids 82 and 83. Solenoid 83 opens a switch 83a in the circuit of solenoid 80. Solenoid 82 closes switch 82a starting motor 32 in the reverse direction at high speed and closes a switch 82b providing a holding circuit for itself until cam 69 opens switch 68, or carriage 20 opens switch 84.

The arrangement is such that "hunting" movements are avoided and the belt is kept in closely aligned position by a succession of corrective forces of increasing magnitude resulting from movements of roll 24.

Variations may be made without departing from the scope of the invention as it is defined by the following claims.

I claim:

1. Apparatus for maintaining alignment of a travelling belt, said apparatus comprising a roll mounted tangent to a relatively straight reach of the belt and moveable angularly with relation to the direction of travel of the belt about a pivot, detector means supported adjacent margins of the belt responsive to position of an edge of the belt, reversible power-operated means engaging said roll for changing the angular relation of the roll to the belt, and means responsive to said detector means for controlling said power-operated means, said last named means comprising a power supply circuit for said power-operated means responsive to shifting of the belt in one direction for adjusting the angular position of the roll to return the belt to its normal position, a power supply circuit for said power-operated means responsive to shifting of the belt in the opposite direction for adjusting the angular position of the roll to return the belt to its normal position, and said circuits including means responsive to angular positioning of said roll in excess of a fixed limit of angularity to provide return of said roll to a mid-position.

2. Apparatus for maintaining alignment of a travelling belt, said apparatus comprising a roll mounted tangent to a relatively straight reach of the belt and moveable angularly with relation to the direction of travel of the belt about a pivot, detector means supported adjacent a margin of the belt for contacting an edge of the belt, reversible power-operated means engaging said roll, said last named means comprising a power supply circuit for said power-operated means responsive to shifting of the belt in one direction for adjusting the angular position of the roll to return the belt to its normal position, a power supply circuit for said power-operated means responsive to shifting of the belt in the opposite direction for adjusting the angular position of the roll to return the belt to its normal position, a timing means including cam-operated switches in said circuits for continuously interrupting said circuits and thereby dividing movements of said roll into small increments, and means in said circuits and responsive to movement of said roll in excess of a fixed limit of angularity for providing return of said roll to mid-position by a continuous movement.

3. Apparatus for maintaining alignment of a travelling belt, said apparatus comprising a roll mounted tangent to a relatively straight reach of the belt and moveable angularly in the plane of the reach of the belt from a normal position in true rolling control with the belt to positions tending to urge the belt laterally, reversible power-operated means mounted for shifting said roll angularly in opposite directions, means interrupting said angular movements to provide such movements intermittently by small increments, detector means mounted at margins of the belt for contact therewith and responsive to the lateral movement of a margin of said belt for controlling the direction of movement of said power-operated means, and means responsive to angular movement of said roll beyond a fixed limit for returning said roll to its normal position.

4. Apparatus for maintaining alignment of a travelling belt, said apparatus comprising a roll mounted tangent to a relatively straight reach of the belt and moveable angularly in the plane of the reach of the belt from a normal position in true rolling contact with the belt to positions tending to urge the belt laterally, reversible power-operated means connected to said roll for shifting said roll angularly in opposite directions at slow speed, means interrupting actuation of said power-operated means at regular intervals to provide intermittent angular movement of said roll by small increments, detector means at margins of the belt responsive to lateral movement of a margin of said belt for controlling the direction of movement of said power operated means, and means responsive to angular movement of said roll beyond a fixed limit for returning said roll to its normal position at an increased speed.

5. Apparatus for maintaining alignment of a travelling belt, said apparatus comprising a roll disposed across and in contact with the belt and mounted for movement to change its angular relation across the belt, means at the belt for detecting lateral shifting movement of the belt, power-operated means for changing the angular relation of said roll across the belt, said power-operated means comprising a motor for shifting said roll, circuit means in connection with the detector means and said motor for normally providing current to said motor in response to lateral shifting movement of the belt and means in said circuit means for interrupting the current to said motor at intervals to cause said motor to shift said roll intermittently in successive increments.

6. Apparatus for maintaining alignment of a travelling belt, said apparatus comprising a roll disposed across and in contact with the belt and mounted for movement to change its angular relation across the belt, means at the belt for detecting lateral shifting movement of the belt, power-operated means for changing the angular relation of said roll across the belt, said power-operated means comprising a motor for shifting said motor, means driven by said motor for shifting said roll in either direction from a position normal to the line of travel of said belt, circuit means in connection with the detector means and said motor for normally providing current to drive said motor in opposite directions in response to lateral shifting movement of the belt, and means in said circuit means for interrupting the current to said motor at intervals to cause said motor to shift said roll intermittently in successive increments.

7. Apparatus for maintaining alignment of a travelling belt, said apparatus comprising a rotatable member in contact with the face of the belt with its axis disposed across the belt, said member being mounted for movement to change the angular relation of its axis across the belt, means at the belt for detecting lateral shifting movement of the belt, power-operated means for changing the angular relation of said member across the belt, said power-operated means comprising motor means for shifting said member, circuit means in connection with the detector means and said motor means normally supplying power to said motor means in response to lateral shifting movement of the belt, means in said circuit means for interrupting the supply of power to said motor means to cause said motor means to shift said roll intermittently in successive increments, and means in said circuit means responsive to angular movement of said member beyond a fixed limit of angularity for closing a normally open branch of said circuit means and thereby reversing said motor means to return said member to its normal angular relation to said belt.

8. Apparatus for maintaining alignment of a travelling belt, said apparatus comprising a roll disposed across and in contact with the belt and mounted for movement to change its angular relation across the belt, means at the belt for detecting lateral shifting movement of the belt, power-operated means for changing the angular relation of said roll across the belt, said power-operated means comprising a motor for shifting said roll, circuit means in connection with the detector means and said motor normally providing current to said motor in response to lateral shifting movement of the belt, means in said circuit means for interrupting the current to said motor to cause said motor to shift said roll intermittently in successive increments, and means in said circuit responsive to angular movement of said roll beyond a fixed limit of angularity for closing a normally open branch of said circuit and thereby reversing said motor to return said roll to its normal angular relation to said belt.

9. Apparatus for maintaining alignment of a travelling belt, said apparatus comprising a roll disposed across and in contact with the belt and mounted for movement to change its angular relation across the belt, means at the belt for detecting lateral shifting movement of the belt, power-operated means for changing the angular relation of said roll across the belt, said power-operated means comprising a motor for shifting said roll, circuit means in connection with the detector means and said motor normally providing current to said motor in response to lateral shifting movement of the belt, means in said circuit means for interrupting the current to said motor to cause said motor to shift said roll intermittently in successive increments in a direction increasing the angular relation of said roll to said belt, means in said circuit responsive to angular movement of said roll beyond a fixed limit of angularity for reversing said motor to return said roll to its normal angular relation to said belt in a single movement.

10. Apparatus for maintaining alignment of a travelling belt, said apparatus comprising detector means mounted at a margin of the belt and responsive to lateral shift of said margin in the direction of said means by an amount causing contact of said margin with said detector means to energize alignment restoring mechanism, and alignment restoring mechanism including an angularly adjustable rotatable roll contacting a face of the belt and adapted to be energized by movement of said detector means and comprising intermittently operated power supply means in adjusting contact with said alignment restoring mechanism for applying a series of successive forces to said belt laterally thereof during the lateral drift of said belt to return the belt to its normal course, and means effective upon return of said belt to travel of said belt in its normal course for interrupting application of lateral forces to said belt by said force applying means.

11. Apparatus for maintaining alignment of a travelling belt, said apparatus comprising detector means mounted at a margin of the belt and responsive to lateral shift of said margin in the direction of said means by an amount causing contact of said margin with said detector means to energize alignment restoring mechanism, and alignment restoring mechanism including an angularly adjustable rotatable roll contacting a face of the belt and adapted to be energized by movement of said detector means and comprising intermittently operated power supply means in adjusting contact with said alignment restoring mechanism for applying a series of laterally applied forces of successively increasing magnitude to said belt laterally thereof sufficient to initiate return of the belt toward its normal course, said last named including reversible motor means for adjusting said angularly adjustable roll while maintaining engagement of the roll with the reach of the belt, and means responsive to adjustment of said roll to its most angular position to return said roll to a position of minimum angularity.

ANTON G. SEIFRIED.

REFERENCES CITED

The following references are of record in the file of this patent:

UNITED STATES PATENTS

| Number | Name | Date |
|---|---|---|
| 1,545,309 | Davis et al. | July 7, 1925 |
| 2,484,473 | Staege | Oct. 11, 1949 |